United States Patent
Hada

(10) Patent No.: US 9,692,978 B2
(45) Date of Patent: Jun. 27, 2017

(54) IMAGE CAPTURING APPARATUS, CONTROL METHOD THEREFOR, AND STORAGE MEDIUM

(71) Applicant: CANON KABUSHIKI KAISHA, Tokyo (JP)

(72) Inventor: Tetsuya Hada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 14/960,675

(22) Filed: Dec. 7, 2015

(65) Prior Publication Data

US 2016/0165142 A1 Jun. 9, 2016

(30) Foreign Application Priority Data

Dec. 8, 2014 (JP) ................................. 2014-248419

(51) Int. Cl.
  *H04N 5/232* (2006.01)

(52) U.S. Cl.
  CPC ......... *H04N 5/23293* (2013.01); *H04N 5/232* (2013.01); *H04N 5/23206* (2013.01); *H04N 5/23212* (2013.01); *H04N 5/23216* (2013.01); *H04N 5/23296* (2013.01)

(58) Field of Classification Search
  CPC ........... H04N 5/23203; H04N 5/23206; H04N 5/23212; H04N 5/23216; H04N 5/23293
  USPC ................................................... 348/333.07
  See application file for complete search history.

(56) References Cited

U.S. PATENT DOCUMENTS

| | | | | |
|---|---|---|---|---|
| 6,809,759 | B1* | 10/2004 | Chiang | H04N 5/23293 348/211.2 |
| 9,171,506 | B2* | 10/2015 | Ishihara | H04N 5/2353 |
| 9,451,144 | B2* | 9/2016 | Dye | H04N 5/23206 |
| 9,584,713 | B2* | 2/2017 | Ikeda | H04N 5/23206 |
| 2007/0025711 | A1 | 2/2007 | Marcus | |

(Continued)

FOREIGN PATENT DOCUMENTS

| | | |
|---|---|---|
| JP | 2009-273033 A | 11/2009 |
| SG | 138477 A1 | 1/2008 |
| WO | 2006/122189 A2 | 11/2006 |

OTHER PUBLICATIONS

British Search Report issued on Jun. 21, 2016 that issued in the corresponding U.K. Patent Application No. GB1521512.2.

*Primary Examiner* — Daniel M Pasiewicz
(74) *Attorney, Agent, or Firm* — Cowan, Liebowitz & Latman, P.C.

(57) ABSTRACT

There is provided an image capturing apparatus. A detection unit detects a position that has been designated by a user on a first display screen. A display unit displays, on the first display screen, a captured image generated by a image capturing unit. A transmission unit transmits the captured image to an external apparatus, the external apparatus being configured to display the captured image on a second display screen and detect a position that has been designated by the user on the second display screen. An obtaining unit configured to obtain, from the detection unit or the external apparatus, position information based on the position designated by the user. A selection unit selects a partial region of the captured image based on the position information if the position designated by the user is within an effective range.

12 Claims, 10 Drawing Sheets

(56) References Cited

U.S. PATENT DOCUMENTS

| | | | |
|---|---|---|---|
| 2009/0244357 A1* | 10/2009 | Huang | H04N 5/23293 348/345 |
| 2010/0283754 A1* | 11/2010 | Nakao | G06F 3/04847 345/173 |
| 2011/0115932 A1* | 5/2011 | Shin | H04N 5/232 348/211.4 |
| 2012/0113056 A1* | 5/2012 | Koizumi | H04N 5/232 345/175 |
| 2012/0307091 A1* | 12/2012 | Yumiki | H04N 5/23203 348/211.4 |
| 2015/0049233 A1* | 2/2015 | Choi | H04N 5/232 348/333.01 |
| 2016/0065831 A1* | 3/2016 | Howard | H04N 5/23206 348/211.2 |

* cited by examiner

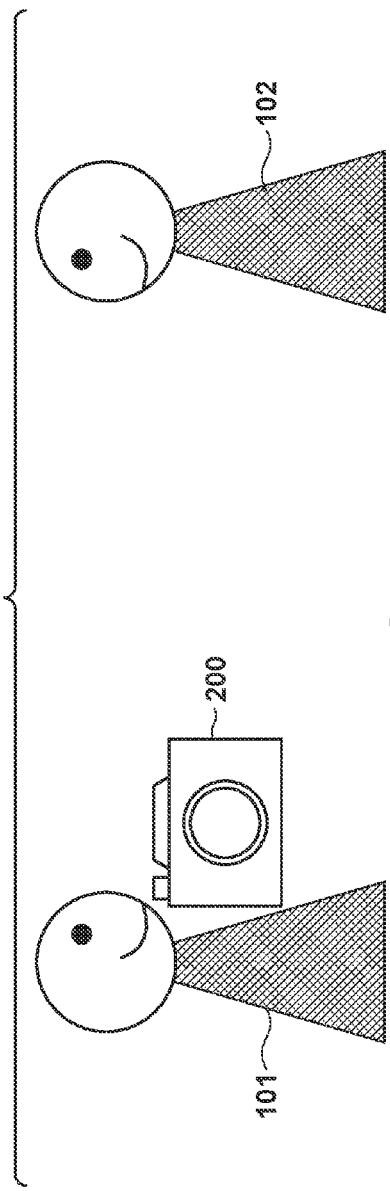
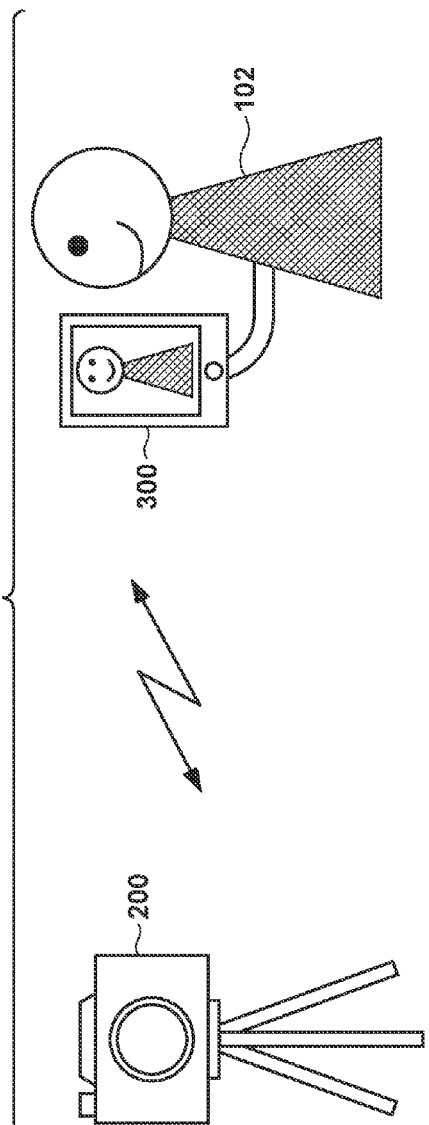
FIG. 1A
FIG. 1B

IMAGE CAPTURING APPARATUS, CONTROL METHOD THEREFOR, AND STORAGE MEDIUM

BACKGROUND OF THE INVENTION

Field of the Invention

The present invention relates to an image capturing apparatus, a control method therefor, and a storage medium.

Description of the Related Art

Techniques to wirelessly connect a digital camera to a mobile terminal, such as a smartphone and a tablet terminal, have become more widely used. As applications of such techniques, techniques to remotely control an image capture function of a digital camera through a user's operation on a touch panel provided to a mobile terminal have also become more widely used. There is a known technique to display a so-called viewfinder image (live-view image) on a display of a mobile terminal, and to perform autofocus (AF) processing and auto exposure (AE) processing based on a specific region of the display in response to a user's touch on the specific region (Japanese Patent Laid-Open No. 2009-273033). For digital cameras provided with a touch panel, there is a known technique to display a live-view image on a display of a digital camera, and to perform AF and AE based on a specific region of the display in response to a user's touch on the specific region.

In some cases, an auxiliary image, such as an icon, that can be selected by a user's touch is displayed by being superimposed over a live-view image displayed on a display of a digital camera. In such cases, if the entire region of the live-view image is responsive to a user's touch in performing AF and AE, an undesirable result may be yielded.

Furthermore, a digital camera and a mobile terminal do not necessary display a live-view image in the same manner. For example, in some cases, a digital camera displays an auxiliary image superimposed over a live-view image, whereas a mobile terminal displays an auxiliary image and a live-view image in different regions of a display thereof. In such cases, if AF and AE are performed in response to a user's touch on a display, an undesirable result may be yielded unless whether the display belongs to a digital camera or a mobile terminal is taken into consideration.

The above-described problems may occur not only in a case where a user touches a display for the purpose of AF and AE, but also in a case where the user touches the display for other purposes (e.g., for the purpose of magnifying a touched region). Furthermore, the above-described problems may occur not only in a case where a region is designated by a user's touch on a touch panel, but also in a case where a region is designated using other methods (e.g., operation of an arrow key).

SUMMARY OF THE INVENTION

The present invention has been made in view of the foregoing situation, and provides a technique to, in a case where a position has been designated on a display screen displaying a captured image, execute processing in accordance with whether the position has been designated on an image capturing apparatus or on an external apparatus.

According to a first aspect of the present invention, there is provided an image capturing apparatus comprising: a detection unit configured to detect a position that has been designated by a user on a first display screen; a display unit configured to display, on the first display screen, a captured image generated by an image capturing unit; a transmission unit configured to transmit the captured image to an external apparatus, the external apparatus being configured to display the captured image on a second display screen and detect a position that has been designated by the user on the second display screen; an obtaining unit configured to obtain, from the detection unit or the external apparatus, position information based on the position designated by the user; and a selection unit configured to in a case where the position information has been obtained from the detection unit, if the position designated by the user is within a first region corresponding to a part of the captured image on the first display screen, select a partial region of the captured image based on the position information, and in a case where the position information has been obtained from the external apparatus, if the position designated by the user is within a second region, which is different from the first region, of the captured image on the second display screen, select a partial region of the captured image based on the position information.

According to a second aspect of the present invention, there is provided a control method for an image capturing apparatus that includes a detection unit configured to detect a position that has been designated by a user on a first display screen; a display unit configured to display, on the image first display screen, a captured image generated by an image capturing unit; and a transmission unit configured to transmit the captured image to an external apparatus, the external apparatus being configured to display the captured image on a second display screen and detect a position that has been designated by the user on the second display screen, the control method comprising: obtaining, from the detection unit or the external apparatus, position information based on the position designated by the user; in a case where the position information has been obtained from the detection unit, if the position designated by the user is within a first region corresponding to a part of the captured image on the first display screen, selecting a partial region of the captured image based on the position information; and in a case where the position information has been obtained from the external apparatus, if the position designated by the user is within a second region, which is different from the first region, of the captured image on the second display screen, selecting a partial region of the captured image based on the position information.

According to a third aspect of the present invention, there is provided a non-transitory computer-readable storage medium which stores a program for causing a computer to execute a control method for an image capturing apparatus that includes a detection unit configured to detect a position that has been designated by a user on a first display screen; a display unit configured to display, on the first display screen, a captured image generated by an image capturing unit; and a transmission unit configured to transmit the captured image to an external apparatus, the external apparatus being configured to display the captured image on a second display screen and detect a position that has been designated by the user on the second display screen, the control method comprising: obtaining, from the detection unit or the external apparatus, position information based on the position designated by the user; in a case where the position information has been obtained from the detection unit, if the position designated by the user is within a first region corresponding to a part of the captured image on the first display screen, selecting a partial region of the captured image based on the position information; and in a case where the position information has been obtained from the external apparatus, if the position designated by the user is within a second region, which is different from the first region, of the captured image on the second display screen, selecting a partial region of the captured image based on the position information.

Further features of the present invention will become apparent from the following description of exemplary embodiments with reference to the attached drawings.

BRIEF DESCRIPTION OF THE DRAWINGS

FIGS. 1A and 1B show modes of use of a digital camera 200 according to a first embodiment.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

Furthermore, the embodiments described below may be modified or changed as appropriate in accordance with a configuration and various conditions of an apparatus to which the present invention is applied. Moreover, the embodiments can be combined as appropriate.

First Embodiment

<<Modes of Use of Digital Camera 200>>

FIGS. 1A and 1B show modes of use of a digital camera 200 according to a first embodiment. FIG. 1A shows a mode of use of the digital camera 200 for performing normal image capture. In FIG. 1A, a photographer 101 and a subject 102 are different people; the photographer 101 captures an image of the subject 102 by operating the digital camera 200.

On the other hand, FIG. 1B shows a mode of use of the digital camera 200 for performing remote image capture. In FIG. 1B, the subject 102 plays roles of both a subject and a photographer; the subject 102 captures an image of him/herself by operating a smartphone 300 that functions as a remote control apparatus. Specifically, the subject 102 wirelessly connects the digital camera 200 and the smartphone 300, and remotely operates the digital camera 200 from the smartphone 300. The subject 102 confirms that he/she fits within a frame by viewing a display screen of the smartphone 300, and then instructs the digital camera 200 to perform image capture from the smartphone 300.

<<Configuration of Digital Camera 200>>

Figure 2:
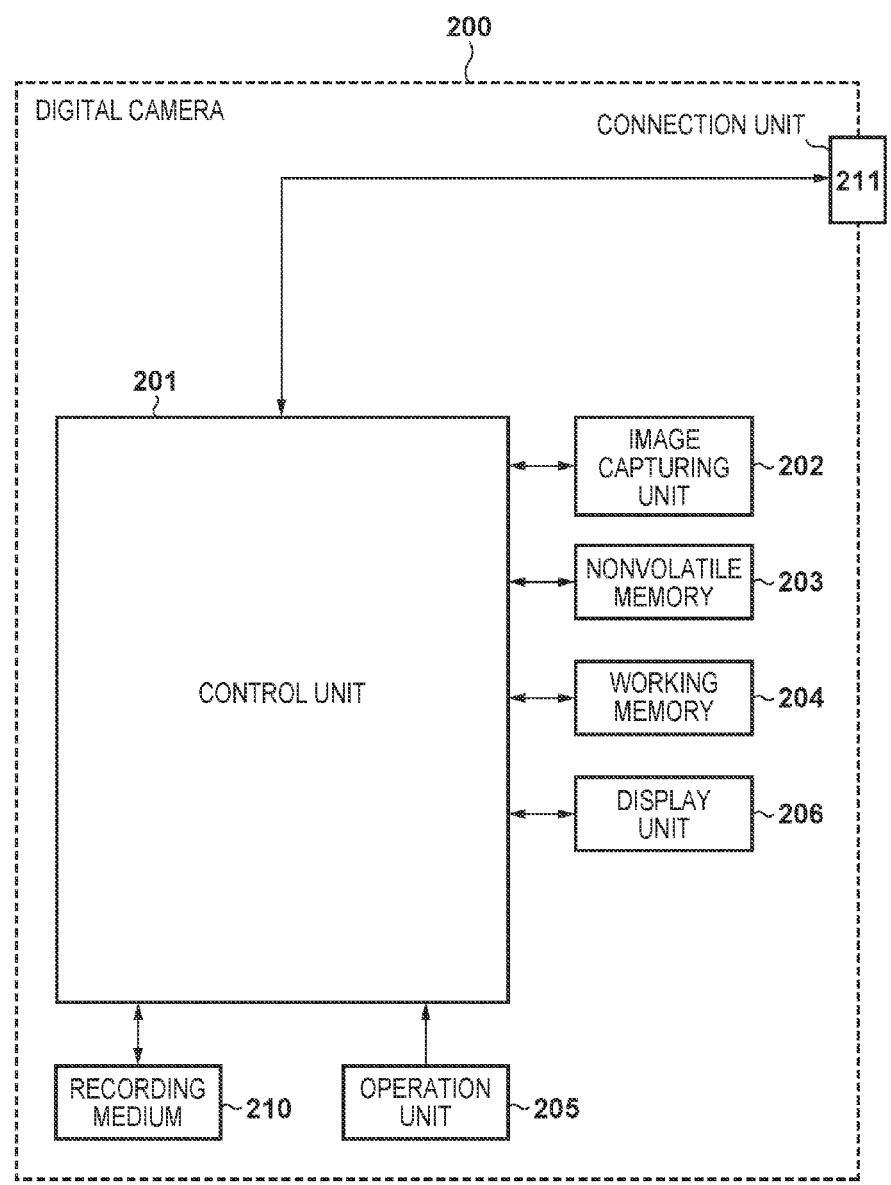
FIG. 2 is a block diagram showing a configuration of the digital camera 200 according to the first embodiment.

FIG. 2 is a block diagram showing a configuration of the digital camera 200 according to the first embodiment. Although a digital camera is described herein as an example of an image capturing apparatus, the image capturing apparatus is not limited to a digital camera. For example, the digital camera 200 may be replaced with a mobile media player, a tablet terminal, or a personal computer having an image capturing function, among others.

In FIG. 2, a control unit 201 controls components of the digital camera 200 in accordance with an input signal, a later-described program, and the like. Instead of being controlled by the control unit 201, the entire apparatus may be controlled by a plurality of items of hardware executing distributed processing.

An image capturing unit 202 converts light of the subject formed by a lens included in the image capturing unit 202 into an electrical signal, executes noise reduction processing and the like, and outputs digital data as image data. After image data obtained through image capture is stored into a buffer memory secured within a later-described working memory 204, the control unit 201 applies predetermined computation processing to the image data, and then the image data is recorded into a recording medium 210.

It should be noted that the image capturing unit 202 need not be integrated with the digital camera 200. For example, instead of including the image capturing unit 202, the digital camera 200 may be configured to obtain data of a captured image from an external image capturing unit.

A nonvolatile memory 203 is an electrically erasable and recordable nonvolatile memory, and stores, for example, a program executed by the control unit 201. The working memory 204 is used as a buffer memory for temporarily retaining image data obtained through image capture by the image capturing unit 202, as an image display memory for a display unit 206, as a working area for the control unit 201, and the like.

An operation unit 205 is used to accept an instruction issued by a user to the digital camera 200. The operation unit 205 includes, for example, operation members operated by the user, such as a power button for issuing an instruction for turning on/off a power of the digital camera 200, a release switch for issuing an instruction for image capture, and a zoom lever for issuing an instruction for a zoom operation. The operation members of the operation unit 205 also include, for example, a reproduction button for issuing an instruction for reproducing image data. A touch panel formed on the later-described display unit 206 is also included in the operation unit 205. It should be noted that the release switch has SW1 and SW2. When the release switch is pressed halfway down, SW1 is turned on. The digital camera 200 accordingly accepts an instruction for performing an image capture preparation, such as autofocus (AF) processing, auto exposure (AE) processing, auto white balance (AWB) processing, and preliminary flash emission (EF). When the release switch is pressed all the way down, SW2 is turned on. The digital camera 200 accordingly accepts an instruction for performing image capture.

The display unit 206 displays a viewfinder image at the time of image capture, image data obtained through image capture, characters for interactive operation, and the like. It should be noted that the display unit 206 need not necessarily be built in the digital camera 200. It is sufficient for the digital camera 200 to have at least a display control function of connecting to the internal or external display unit 206 and of controlling display of the display unit 206.

Image data output from the image capturing unit 202 can be recorded into the recording medium 210. The recording medium 210 may be configured such that it is attachable to and removable from the digital camera 200, and may be built in the digital camera 200. That is to say, it is sufficient for the digital camera 200 to have at least a function of accessing the recording medium 210.

A connection unit 211 is an interface for connecting to an external apparatus. The digital camera 200 according to the present embodiment can exchange data with the external apparatus via the connection unit 211. It should be noted that, in the present embodiment, the connection unit 211 includes an interface for communicating with the external apparatus via a wireless LAN. The control unit 201 enables wireless communication between the digital camera 200 and the external apparatus by controlling the connection unit 211. It should be noted that a communication method is not limited to a wireless LAN.

<<Configuration of Smartphone 300>>

Figure 3:
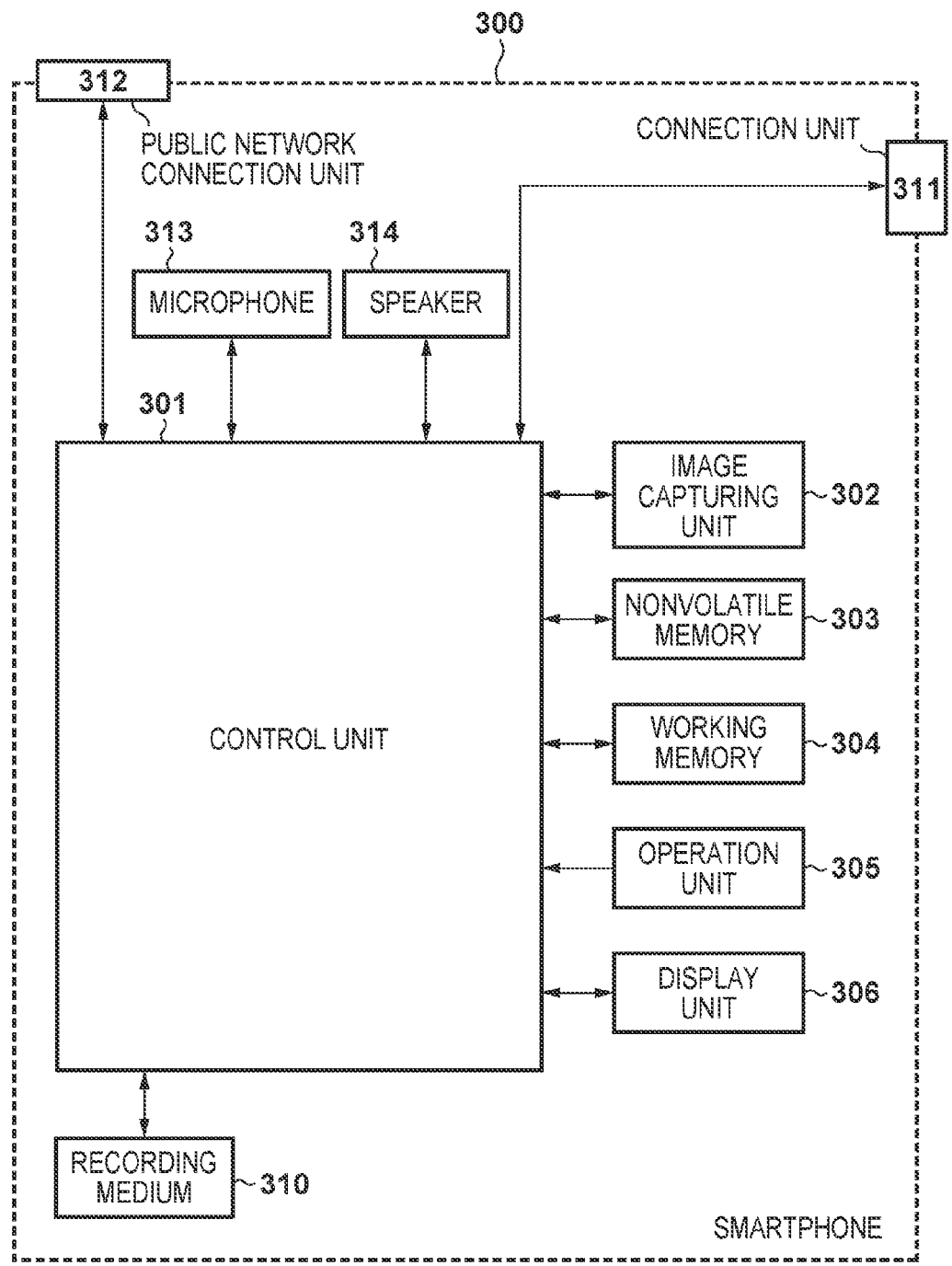
FIG. 3 is a block diagram showing a configuration of a smartphone 300 according to the first embodiment.

FIG. 3 is a block diagram showing a configuration of the smartphone 300 according to the first embodiment. The smartphone 300 is used as a remote control apparatus for remotely operating the digital camera 200. Although a smartphone is described herein as an example of a remote control apparatus, the remote control apparatus is not limited to a smartphone. For example, the smartphone 300 may be replaced with a digital camera, a mobile media player, a tablet terminal, a personal computer, or a mobile telephone having a wireless function, among others.

In FIG. 3, a control unit 301 controls components of the smartphone 300 in accordance with an input signal, a later-described program, and the like. Instead of being controlled by the control unit 301, the entire apparatus may be controlled by a plurality of items of hardware executing distributed processing.

An image capturing unit 302 converts light of the subject formed by a lens included in the image capturing unit 302 into an electrical signal, executes noise reduction processing and the like, and outputs digital data as image data. After image data obtained through image capture is stored into a buffer memory secured within a later-described working memory 304, the control unit 301 applies predetermined computation processing to the image data, and then the image data is recorded into a recording medium 310.

A nonvolatile memory 303 is an electrically erasable and recordable nonvolatile memory, and stores, for example, a program executed by the control unit 301. It will be assumed that a program for communication with the digital camera 200 is also retained in the nonvolatile memory 303 and has been installed as a camera communication application in the smartphone 300. It should be noted that processing of the smartphone 300 according to the present embodiment is realized by the control unit 301 reading in the program provided as the camera communication application from the nonvolatile memory 303, and executing the read program. It will also be assumed that the camera communication application includes a program for using basic functions of an operating system (OS) installed in the smartphone 300. It should be noted that the OS of the smartphone 300 may include a program for realizing processing of the present embodiment.

The working memory 304 is used as a buffer memory for temporarily retaining image data generated by the image capturing unit 302, as an image display memory for a display unit 306, as a working area for the control unit 301, and the like.

An operation unit 305 is used to accept an instruction issued by the user to the smartphone 300. The operation unit 305 includes, for example, operation members operated by the user, such as a power button for issuing an instruction for turning on/off a power of the smartphone 300, and a touch panel formed on the display unit 306.

The display unit 306 displays image data, characters for interactive operation, and the like. It should be noted that the display unit 306 need not necessarily be built in the smartphone 300. It is sufficient for the smartphone 300 to have at least a display control function of connecting to the internal or external display unit 306 and of controlling display of the display unit 306.

Image data output from the image capturing unit 302 can be recorded into the recording medium 310. The recording medium 310 may be configured such that it is attachable to and removable from the smartphone 300, and may be built in the smartphone 300. That is to say, it is sufficient for the smartphone 300 to have at least a function of accessing the recording medium 310.

A connection unit 311 is an interface for connecting to an external apparatus. The smartphone 300 according to the present embodiment can exchange data with the external apparatus via the connection unit 311. It should be noted that, in the present embodiment, the connection unit 311 includes an interface for communicating with the external apparatus via a wireless LAN. The control unit 301 enables wireless communication between the smartphone 300 and the external apparatus by controlling the connection unit 311. It should be noted that a communication method is not limited to a wireless LAN.

A public network connection unit 312 is an interface used in performing public wireless communication. The smartphone 300 can make/receive a call to/from another device and perform data communication with another device via the public network connection unit 312. At the time of making/receiving a call, an audio signal is input to and output from the control unit 301 via a microphone 313 and a speaker 314. It will be assumed that, in the present embodiment, the public network connection unit 312 includes an interface for performing communication compliant with so-called 3G. It should be noted that the smartphone 300 is not limited to using 3G, and may use other communication methods including Long Term Evolution (LTE), Worldwide Interoperability for Microwave Access (WiMAX), Asymmetric Digital Subscriber Line (ADSL), Fiber To The Home (FTTH), and so-called 4G. Furthermore, each of the connection unit 311 and the public network connection unit 312 need not necessarily be composed of independent hardware. For example, the connection unit 311 and the public network connection unit 312 may share a single antenna.

<<Normal Image Capture Processing>>

Figure 4:
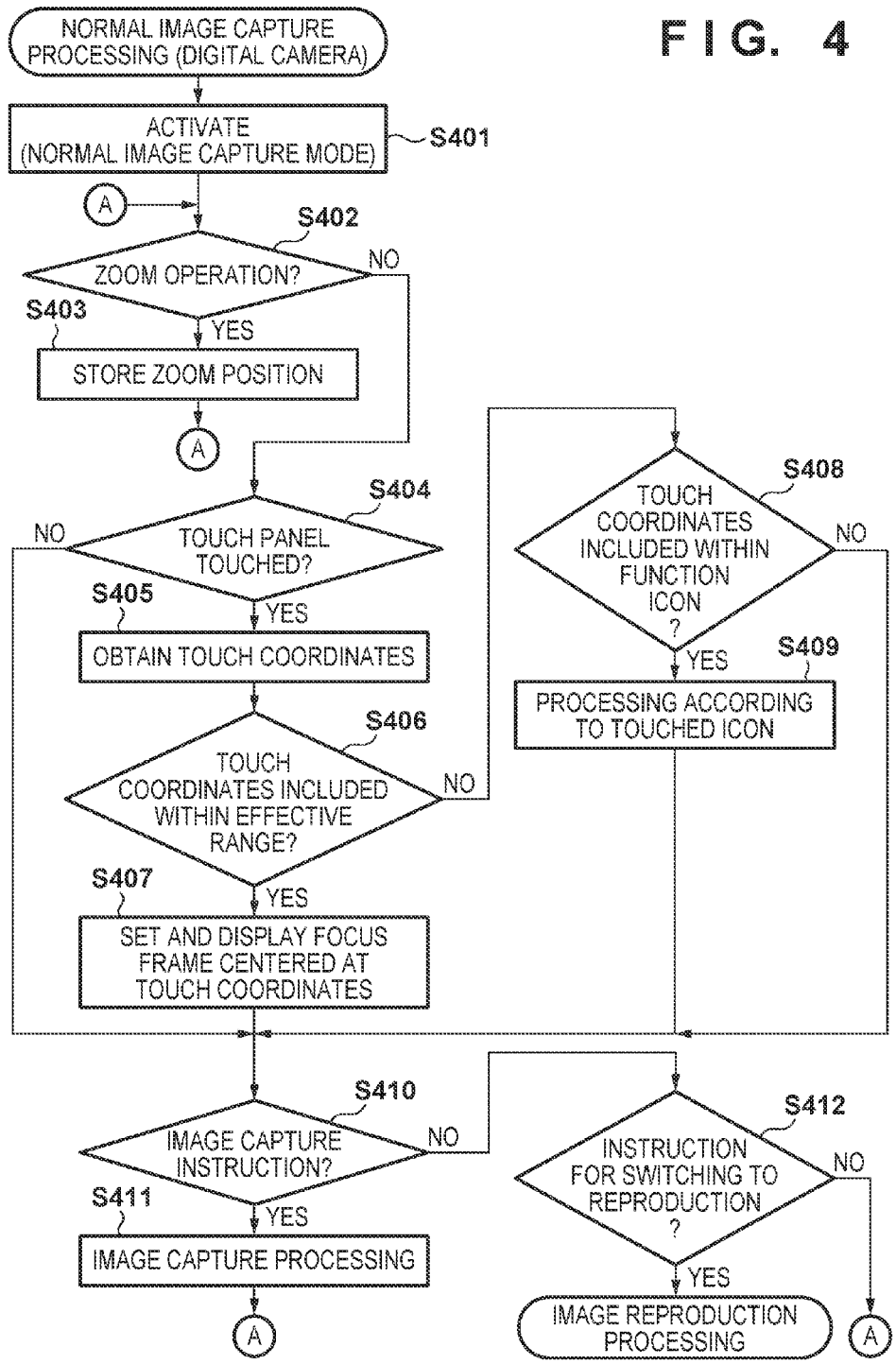
FIG. 4 is a flowchart of normal image capture processing executed by the digital camera 200 according to the first embodiment.

FIG. 4 is a flowchart of normal image capture processing executed by the digital camera 200 according to the first embodiment. It should be noted that the processes of steps shown in the present flowchart are realized by the control unit 201 of the digital camera 200 controlling the components of the digital camera 200 in accordance with an input signal and a program, unless specifically stated otherwise.

The processing of the present flowchart is started when the user has issued an activation instruction to the digital camera 200 by, for example, operating the power button.

In step S401, the control unit 201 activates the digital camera 200 in a normal image capture mode. Once the digital camera 200 has been activated, the control unit 201 displays a captured image generated by the image capturing unit 202 on the display unit 206 as a live-view image.

In step S402, the control unit 201 determines whether the user has performed a zoom operation through operation of the operation unit 205. If the zoom operation has been performed, the control unit 201 proceeds to step S403. If the zoom operation has not been performed, the control unit 201 proceeds to step S404.

In step S403, the control unit 201 stores a current zoom position. Specifically, the control unit 201 obtains information of the zoom position from the image capturing unit 202, and stores the information into the working memory 204. The usage of the stored zoom position will be described later in association with remote image capture processing. Thereafter, the control unit 201 returns to step S402.

In step S404, the control unit 201 determines whether the user has touched the touch panel formed on the display unit 206 as a part of the operation unit 205. If the touch panel has been touched, the control unit 201 proceeds to step S405. If the touch panel has not been touched, the control unit 201 proceeds to step S410.

It will be assumed that, in the present embodiment, the user designates a position (coordinates) on the display unit 206 by touching the touch panel; however, a position is not limited to being designated in this way. For example, the user may designate a position using an arrow key and an enter key included in the operation unit 205.

In step S405, the control unit 201 detects the coordinates of the touched position (touch coordinates) based on information output from the touch panel, and obtains information of the touch coordinates (position information). In step S406, the control unit 201 determines whether the touch coordinates obtained in step S405 are within an effective range in which setting of a focus frame is effective (a first region).

Figure 5:
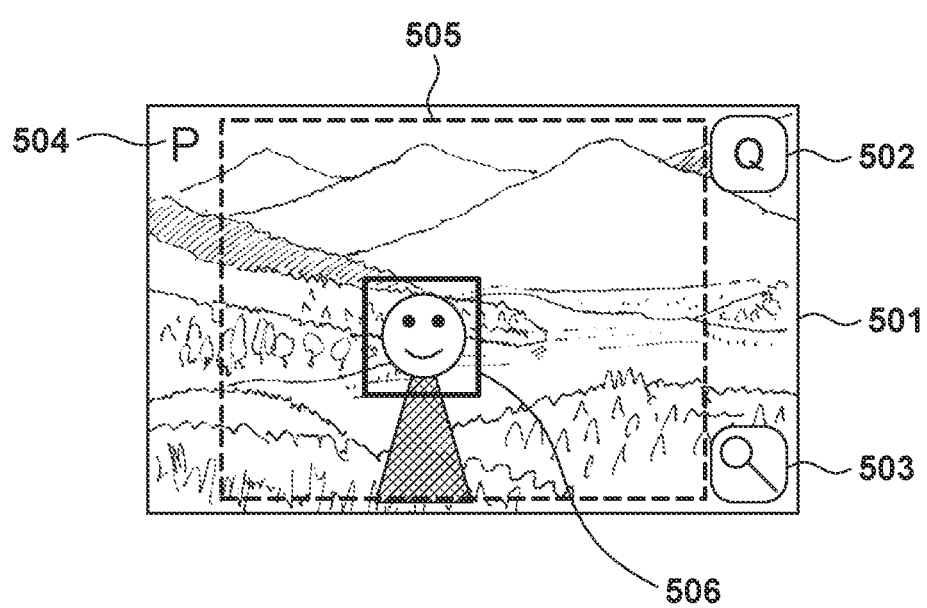
FIG. 5 shows an example of a screen displayed on a display unit 206 while the digital camera 200 is operating in a normal image capture mode.

The following describes an effective range for setting of a focus frame. FIG. 5 shows an example of a screen displayed on the display unit 206 while the digital camera 200 is operating in the normal image capture mode. Reference numeral 501 denotes a live-view image displayed on the display unit 206 of the digital camera 200 (a first display screen). Reference numerals 502 and 503 denote icons whose functions are activated by a touch operation (first icons). The icons 502 and 503 are presented as quadrilaterals having round corners, indicating that they are responsive to a touch. Reference numeral 504 denotes an icon indicating an image capture mode (a second icon). Unlike the icons 502 and 503, the icon 504 is not presented as a quadrilateral having rounded corners, indicating that its function is not activated by touching it.

In the present embodiment, the digital camera 200 presets a region (an effective range) in which a focus frame (a region for focus adjustment) can be set, in consideration of the possibility of a touch on icons whose predetermined functions are touch-activated, such as the icons 502 and 503. In FIG. 5, a frame defined by a dash line, 505, is a region (an effective range) in which a focus frame can be set by a touch operation. A focus frame cannot be set if the user touches outside the effective range 505. It should be noted that the frame defined by the dash line, which represents the effective range 505, may not be actually displayed on the live-view image 501. Reference numeral 506 denotes a focus frame set by a user's touch on the live-view image 501. The focus frame 506 is set and displayed by the user touching inside the effective range 505.

By providing the effective range 505 on the live-view image 501 in the above-described manner, a focus frame can be set without the user erroneously operating an icon responsive to a touch operation. Although a portion of the live-view image 501 excluding an outer peripheral portion thereof is preset as the effective range 505 in the present embodiment as shown in FIG. 5, the effective range 505 is not limited in this way. For example, only the regions displaying icons responsive to a touch operation may be set as regions in which a focus frame cannot be set, and the remaining region may be preset as the effective range 505.

Returning now to FIG. 4, if it is determined in step S406 that the touch coordinates are within the effective range 505, the control unit 201 proceeds to step S407. On the other hand, if it is determined in step S406 that the touch coordinates are not within the effective range 505, the control unit 201 proceeds to step S408.

In step S407, the control unit 201 sets a focus frame centered at the touch coordinates, and displays the focus frame on the display unit 206. Although the present embodiment is described on the assumption that the focus frame is set based on the touch coordinates, the process of step S407 is not limited to setting of the focus frame. For example, the control unit 201 may select a partial region of the captured image based on the touch coordinates, and display the selected partial region in a magnified manner. Stated in a more generalized way, the control unit 201 can select a partial region of the captured image for any purpose based on the touch coordinates.

On the other hand, if the processing has moved from step S406 to step S408, the control unit 201 determines whether the touch coordinates are within an icon responsive to a touch (a function icon). If the touch coordinates are within a function icon, the control unit 201 proceeds to step S409. If the touch coordinates are not within a function icon, the control unit 201 proceeds to step S410.

In step S409, the control unit 201 activates a function corresponding to the touched icon, and executes processing according to the function. In one example, the control unit 201 executes image capture setting processing. Examples of the image capture setting processing include autofocus (AF) processing, auto exposure (AE) processing, auto white balance (AWB) processing, preliminary flash emission (EF) processing, and processing for setting a magnification rate of the live-view image and the like.

In step S410, the control unit 201 determines whether the user has issued an image capture instruction. If the image capture instruction has been issued, the control unit 201 proceeds to step S411. If the image capture instruction has not been issued, the control unit 201 proceeds to step S412.

In step S411, the control unit 201 executes image capture processing. Specifically, the control unit 201 captures an image of the subject by controlling the image capturing unit 202, and deploys data of the captured image to the working memory 204. The control unit 201 then applies image processing to the data of the captured image deployed to the working memory 204, and records generated still image data into the recording medium 210. Thereafter, the control unit 201 returns to step S402.

On the other hand, if the processing has moved from step S410 to step S412, the control unit 201 determines whether an instruction for switching to a reproduction mode has been issued through a user's operation of the operation unit 205.

If the instruction for switching to the reproduction mode has been issued, the control unit 201 causes the digital camera 200 to switch to the reproduction mode. If the instruction for switching to the reproduction mode has not been issued, the control unit 201 returns to step S402.

As described above, in the normal image capture mode, the digital camera 200 confines the effective range for setting of a focus frame to a part of the region of the live-view image. In this way, for example, erroneous operation of an icon is reduced.

<<Remote Connection Processing>>

Figure 6A:
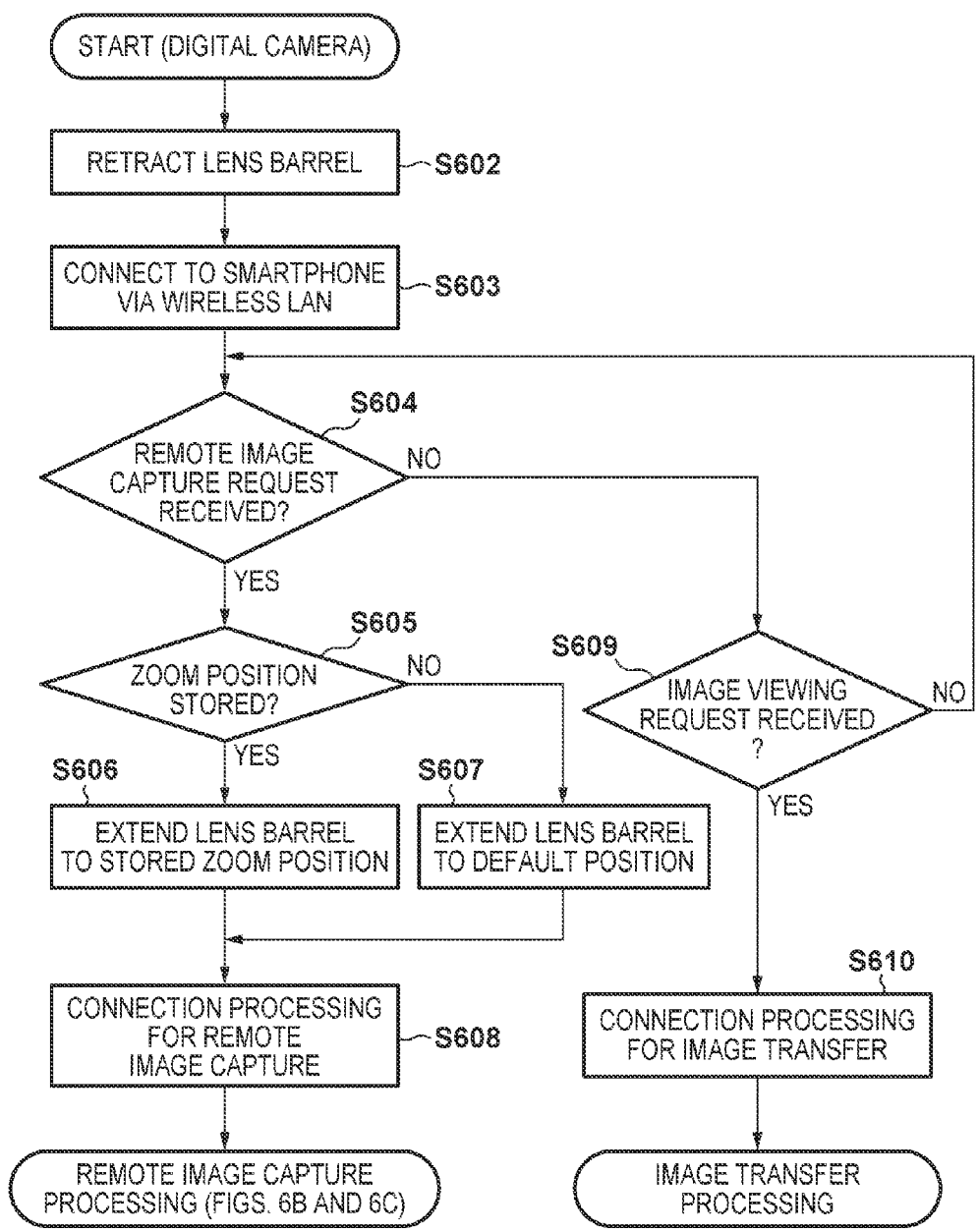
FIG. 6A is a flowchart of remote connection processing executed by the digital camera 200 according to the first embodiment.

FIG. 6A is a flowchart of remote connection processing executed by the digital camera 200 according to the first embodiment. It should be noted that the processes of steps shown in the present flowchart are realized by the control unit 201 of the digital camera 200 controlling the components of the digital camera 200 in accordance with an input signal and a program, unless specifically stated otherwise. The processing of the present flowchart is started when the user has issued, to the digital camera 200, an instruction for switching to a remote connection mode via the operation unit 205 while the digital camera 200 is activated.

In step S602, the control unit 201 retracts a lens barrel by controlling the image capturing unit 202. This is a preparation for performing wireless communication in subsequent processes, and has a purpose of reducing peak power consumption by sequentially excluding processing for wireless communication and extension/retraction of the lens barrel. Thereafter, the control unit 201 proceeds to step S603.

In step S603, the control unit 201 connects to the smartphone 300 via a wireless LAN. The control unit 201 enables wireless LAN connection by controlling the connection unit 211. Step S603 involves wireless LAN connection processing in which the control unit 201 establishes connection to a wireless network, and device connection processing for establishing a communication session with a partner device (the smartphone 300). In a specific example, the control unit 201 first checks whether there is a wireless network to connect to by searching for a nearby wireless network(s). The control unit 201 then executes the wireless LAN connection processing to connect to a desired wireless network, and executes processing for setting an IP address. It should be noted that, instead of connecting to an existing wireless network, the control unit 201 may newly generate a wireless network and cause the smartphone 300 to join in the wireless network generated by the control unit 201. After connecting to the wireless network, the control unit 201 searches for connection partners in the connected wireless network. The device search is realized with the use of a device search protocol, e.g., the Universal Plug and Play (UPnP) and the multicast DNS (mDNS). The control unit 201 displays a list of connection partners discovered with the use of the device search protocol on the display unit 206, and accepts a user's selection of a connection partner via the operation unit 205. It will be assumed that the smartphone 300 has been discovered and selected as a connection partner. The control unit 201 then executes the device connection processing for establishing a communication session with the smartphone 300.

Figure 7:
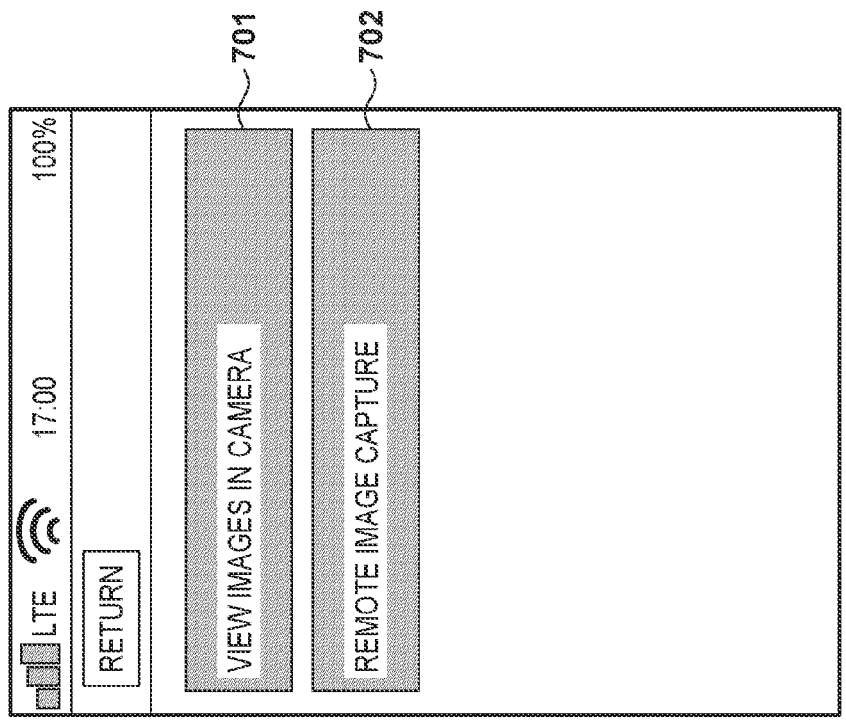
FIG. 7 shows an example of a screen of the smartphone 300 at the time of completion of wireless LAN connection between the digital camera 200 and the smartphone 300.

In step S604, the control unit 201 determines whether a remote image capture request has been received from the smartphone 300. Transmission and reception of the remote image capture request will now be described with reference to FIG. 7. FIG. 7 shows an example of a screen of the smartphone 300 at the time of completion of wireless LAN connection between the digital camera 200 and the smartphone 300 in step S603. The user can select a menu item 701 or 702 by operating the operation unit 305 of the smartphone 300. If the menu item 701 is selected, the control unit 301 of the smartphone 300 transmits an image viewing request to the digital camera 200 by controlling the connection unit 311. The image viewing request will be described later with reference to step S609 of FIG. 6A. If the menu item 702 is selected, the control unit 301 of the smartphone 300 transmits a remote image capture request to the digital camera 200 by controlling the connection unit 311. This remote image capture request is received by the digital camera 200 in step S604 of FIG. 6A.

Returning now to FIG. 6A, if the remote image capture request has been received in step S604, the control unit 201 proceeds to step S605. If the remote image capture request has not been received, the control unit 201 proceeds to step S609.

In step S605, the control unit 201 determines whether the zoom position was stored into the working memory 204 in step S403 of FIG. 4. If the zoom position was stored, the control unit 201 proceeds to step S606. If the zoom position was not stored, the control unit 201 proceeds to step S607.

In step S606, the control unit 201 reads out the stored zoom position from the working memory 204, and moves the lens barrel to the stored zoom position by controlling the image capturing unit 202. In this way, the zoom position stored in step S403 of FIG. 4 can be restored, and remote image capture can be started at the zoom position that was set, before starting remote image capture, such that the subject appropriately fits inside a frame. It should be noted that, in a case where the zoom position stored in the working memory 204 is a digital zoom position instead of an optical zoom position, the lens barrel may be moved to the telephoto end for optical zoom without executing digital zoom processing. The digital zoom processing requires the digital camera 200 or the smartphone 300 to execute image cutout processing. Application of the cutout processing to a live-view image on a frame-by-frame basis may reduce a frame rate; to avoid this, the above-described approach may be taken. Alternatively, in a case where a digital zoom position is used as a zoom position, the control unit 201 can store a zoom position on the telephoto end for optical zoom instead of storing a digital zoom position in step S403 of FIG. 4.

On the other hand, if the zoom position was not stored, the control unit 201 moves the lens barrel to a default zoom position by controlling the image capturing unit 202 in step S607.

In step S608, the control unit 201 executes connection processing for remote image capture. Specifically, the control unit 201 reads out setting from the working memory 204 to generate various types of parameters, such as an image capture parameter, a remaining battery level, and the number of images that can be captured. The control unit 201 then sets the image capture parameter to the image capturing unit 202 and starts generating a live-view image. Also, by controlling the connection unit 211, the control unit 201 transmits the various types of parameters, such as the image capture parameter, the remaining battery level, and the number of images that can be captured, to the smartphone 300, and causes the digital camera 200 to switch to a remote image capture mode.

On the other hand, if the remote image capture request has not been received in step S604, the control unit 201 determines in step S609 whether the image viewing request has been received from the smartphone 300. The image viewing request is transmitted from the smartphone 300 to the digital camera 200 upon selection of the menu item 701 of FIG. 7. If the image viewing request has been received, the control unit 201 proceeds to step S610. If the image viewing request has not been received, the control unit 201 returns to step S604.

In step S610, the control unit 201 executes connection processing for image transfer. Specifically, the control unit 201 transmits a list of image information recorded in the recording medium 210 to the smartphone 300 via the connection unit 211, and causes the digital camera 200 to switch to an image transfer mode. In this way, images in the digital camera 200 can be viewed from the smartphone 300.

<<Remote Image Capture Processing>>

Figure 6B:
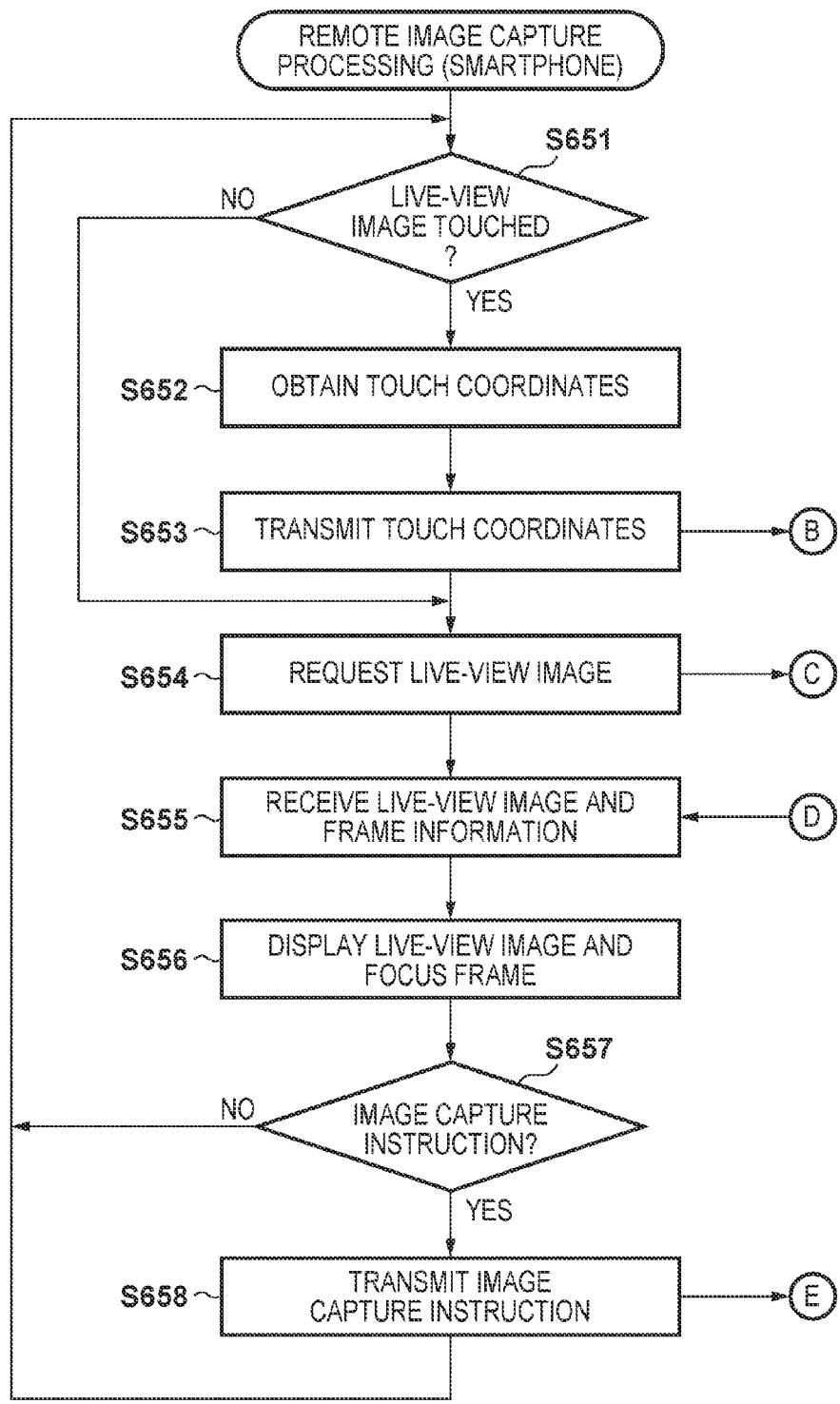
FIGS. 6B and 6C are flowcharts of remote image capture processing executed by the digital camera 200 and the smartphone 300 according to the first embodiment.
Figure 6C:
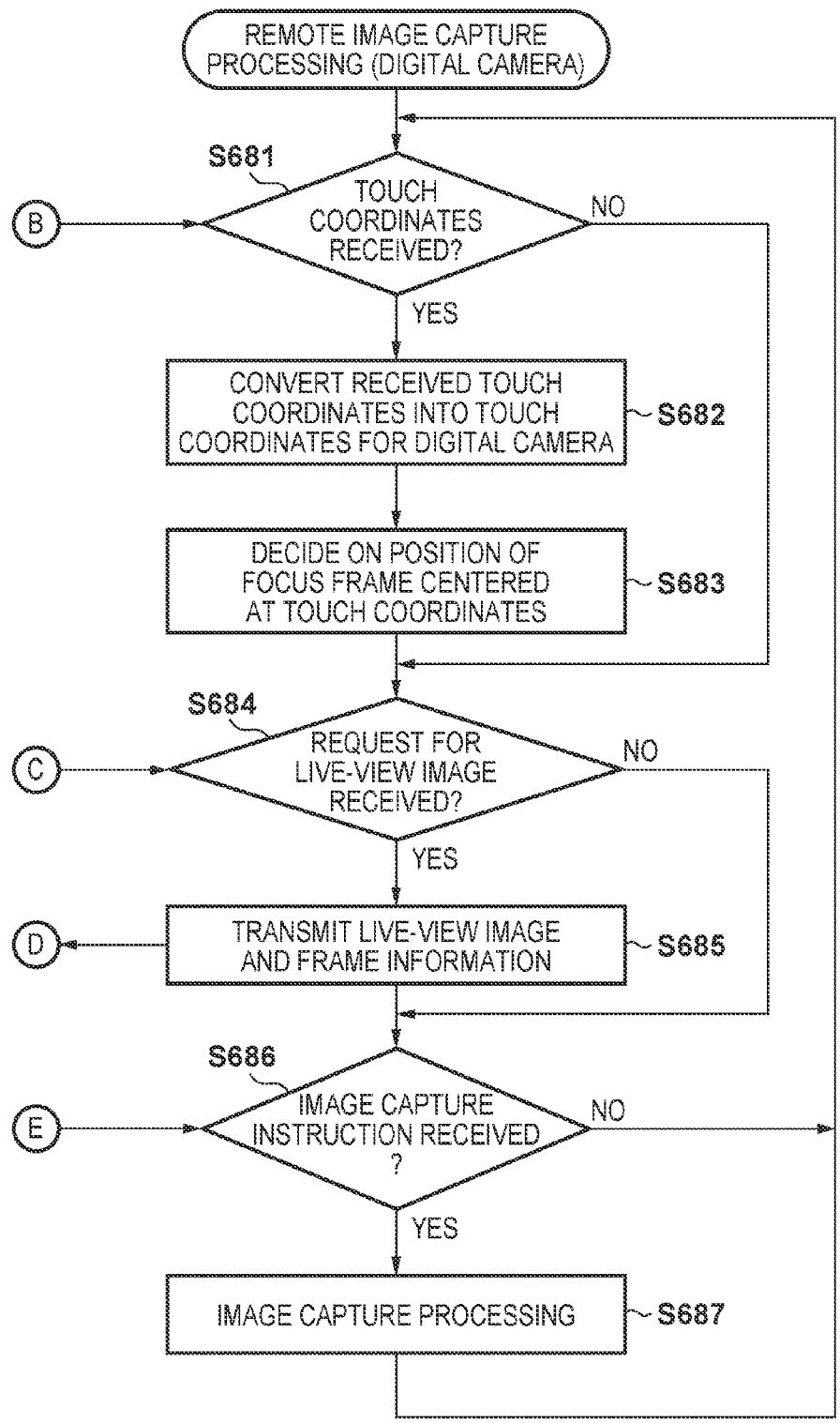

FIGS. 6B and 6C are flowcharts of remote image capture processing executed by the digital camera 200 and the smartphone 300 according to the first embodiment. FIG. 6B shows processing of the smartphone 300, whereas FIG. 6C shows processing of the digital camera 200. It should be noted that the processes of steps executed by the smartphone 300 are realized by the control unit 301 of the smartphone 300 controlling the components of the smartphone 300 in accordance with an input signal and a program, unless specifically stated otherwise. Similarly, the processes of steps executed by the digital camera 200 are realized by the control unit 201 of the digital camera 200 controlling the components of the digital camera 200 in accordance with an input signal and a program, unless specifically stated otherwise. The processing of the present flowcharts is started after the connection processing for remote image capture has been executed in step S608 of FIG. 6A.

Figure 8:
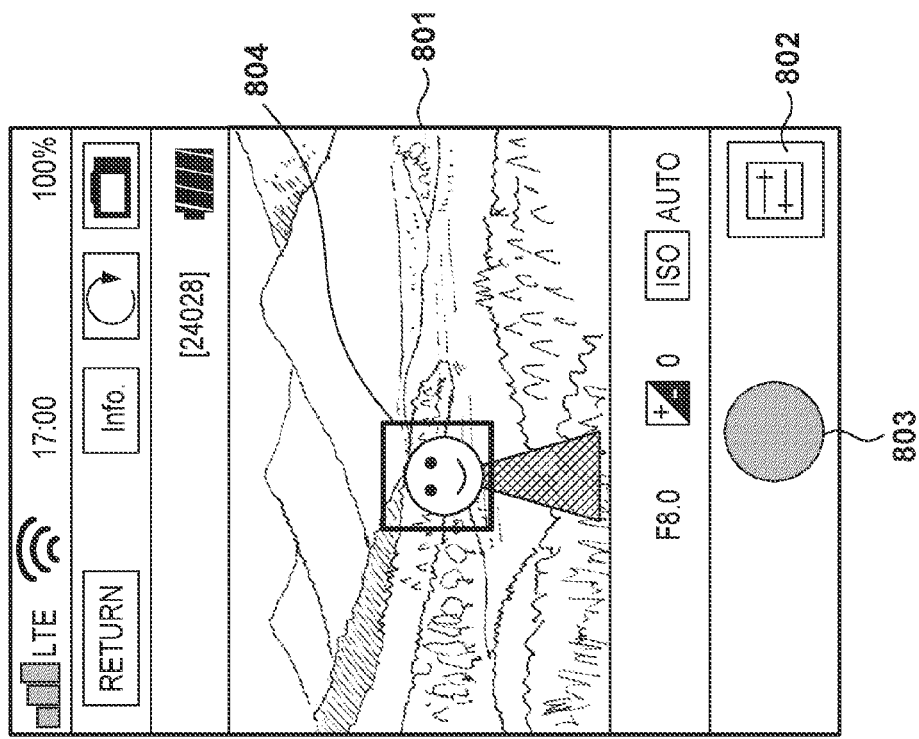
FIG. 8 shows an example of a screen displayed on a display unit 306 while the smartphone 300 is executing the remote image capture processing.

As can be understood from comparison between FIGS. 5 and 8, remote image capture differs from normal image capture in that icons are displayed in regions different from the region of a live-view image, rather than being superimposed over the live-view image. Thus, in the case of remote image capture, a focus frame can be set by touching any part of the region of the live-view image.

FIG. 8 shows an example of a screen displayed on the display unit 306 while the smartphone 300 is executing the remote image capture processing. In FIG. 8, reference numeral 801 denotes a live-view image displayed on the display unit 306 of the smartphone 300 (a second display screen). Reference numeral 802 denotes a setting button that is selected to change the image capture parameter. Reference numeral 803 denotes a shutter button included in the operation unit 305 of the smartphone 300. The user can issue an image capture instruction to the digital camera 200 by touching the shutter button 803. Reference numeral 804 denotes a focus frame displayed by touching any subject in the live-view image 801. In the live-view image 801, there are no icons, buttons, and the like whose functions are activated by a touch operation; therefore, the focus frame can be set by performing a touch operation across the entire region of the live-view image 801 (a second region). As described above, an effective range for setting of a focus frame on the smartphone 300 (the second region) is different from an effective range for setting of a focus frame on the digital camera 200 (the first range).

Although the present embodiment is described on the assumption that the entire region of the live-view image 801 on the smartphone 300 is the effective range for setting of the focus frame, the effective range is not limited in this way. Only a part of the region of the live-view image 801 may be the effective range.

Returning now to FIGS. 6B and 6C, the following describes operations performed by the smartphone 300. In step S651, the control unit 301 determines whether the user has touched the live-view image displayed on the display unit 306. This touch is performed via the touch panel included in the operation unit 305. If the live-view image has been touched, the control unit 301 proceeds to step S652. If the live-view image has not been touched, the control unit 301 proceeds to step S654.

In step S652, the control unit 301 obtains information of the coordinates of the touch (touch coordinates). In step S653, the control unit 301 transmits the touch coordinates to the digital camera 200 via the connection unit 311.

In step S654, the control unit 301 requests the digital camera 200 for a live-view image via the connection unit 311. In step S655, the control unit 301 receives a live-view image and focus frame information from the digital camera 200 via the connection unit 311. The focus frame information indicates, for example, the size(s), position(s), color(s), shape(s), and number of a frame(s). It should be noted that, when no focus frame has been set, the focus frame information is not obtained (or the focus frame information indicating that no focus frame has been set is obtained).

In step S656, the control unit 301 displays the live-view image obtained in step S655 on the display unit 306. The control unit 301 also displays a focus frame(s) based on the focus frame information obtained in step S655. It should be noted that, when no focus frame has been set, no focus frame is displayed.

In step S657, the control unit 301 determines whether the user has issued an image capture instruction. If the image capture instruction has been issued, the control unit 301 proceeds to step S658. If the image capture instruction has not been issued, the control unit 301 returns to step S651.

In step S658, the control unit 301 transmits the image capture instruction to the digital camera 200 via the connection unit 311. Thereafter, the control unit 301 returns to step S651.

Operations performed by the digital camera 200 will now be described. In step S681, the control unit 201 determines whether touch coordinates have been received from the smartphone 300. The touch coordinates received here are transmitted from the smartphone 300 in step S653. If the touch coordinates have been received, the control unit 201 proceeds to step S682. If the touch coordinates have not been received, the control unit 201 proceeds to step S684.

In step S682, the control unit 201 converts the touch coordinates received in step S681 into touch coordinates corresponding to the coordinate system of the touch panel of the digital camera 200. It should be noted that this conversion may be performed by the smartphone 300, and the smartphone 300 may transmit the converted touch coordinates to the digital camera 200.

In step S683, the control unit 201 decides on a position of a focus frame centered at the touch coordinates. Here, the control unit 201 decides on the position of the focus frame for each of the coordinate system of the digital camera 200 and the coordinate system of the smartphone 300. It should be noted that, instead of the control unit 201 deciding on the position of the focus frame for the coordinate system of the smartphone 300, the smartphone 300 may calculate the position of the focus frame for the coordinate system of the smartphone 300 based on the position of the focus frame for the coordinate system of the digital camera 200.

In step S684, the control unit 201 determines whether a live-view image has been requested by the smartphone 300. This request is made by the smartphone 300 in step S654. If the live-view image has been requested, the control unit 201 proceeds to step S685. If the live-view image has not been requested, the control unit 201 proceeds to step S686.

In step S685, the control unit 201 transmits a live-view image and focus frame information to the smartphone 300.

The focus frame information includes information indicating the position of the focus frame that was decided on in step S683. The information thus transmitted is received by the smartphone 300 in step S655.

In step S686, the control unit 201 determines whether an image capture instruction has been received from the smartphone 300. The image capture instruction received here is transmitted from the smartphone 300 in step S658. If the image capture instruction has been received, the control unit 201 proceeds to step S687. If the image capture instruction has not been received, the control unit 201 returns to step S681.

In step S687, the control unit 201 executes image capture processing. This processing is similar to the one executed in step S411 of FIG. 4. Thereafter, the control unit 201 returns to step S681.

As described above, in the first embodiment, the digital camera 200 obtains touch coordinates on the touch panel of the digital camera 200 or the smartphone 300. If the touch coordinates are within the effective range for setting of a focus frame, the digital camera 200 sets a focus frame based on the touch coordinates. The effective range for setting of the focus frame differs between a case in which the touch panel of the digital camera 200 has been touched and a case in which the touch panel of the smartphone 300 has been touched. Thus, in the first embodiment, processing is executed in accordance with whether the touch panel that has been touched belongs to the digital camera 200 or the smartphone 300.

It should be noted that the digital camera 200 can preset an effective range for a touch operation for selecting a partial region also in the case of remote image capture. In this case, the digital camera 200 presets an effective range for the case of normal image capture and an effective range for the case of remote image capture, which is different from normal image capture. Then, the digital camera 200 determines whether the touch coordinates are within the effective range between steps S682 and S683, and based on the result of this determination, determines whether to execute step S683.

Second Embodiment

In the first embodiment, the digital camera 200 presets the effective range 505 for setting of a focus frame in a normal image capture mode (see FIG. 5). In contrast, the second embodiment describes a configuration in which the digital camera 200 changes the effective range 505 in accordance with a position of an icon that is displayed by being superimposed over a live-view image. This makes it possible to appropriately set a focus frame even in a case where the position of the icon dynamically changes.

It should be noted that basic configurations of the digital camera 200 and the smartphone 300 according to the second embodiment are similar to those according to the first embodiment. The following description will be given mainly with a focus on differences from the first embodiment.

Figure 9:
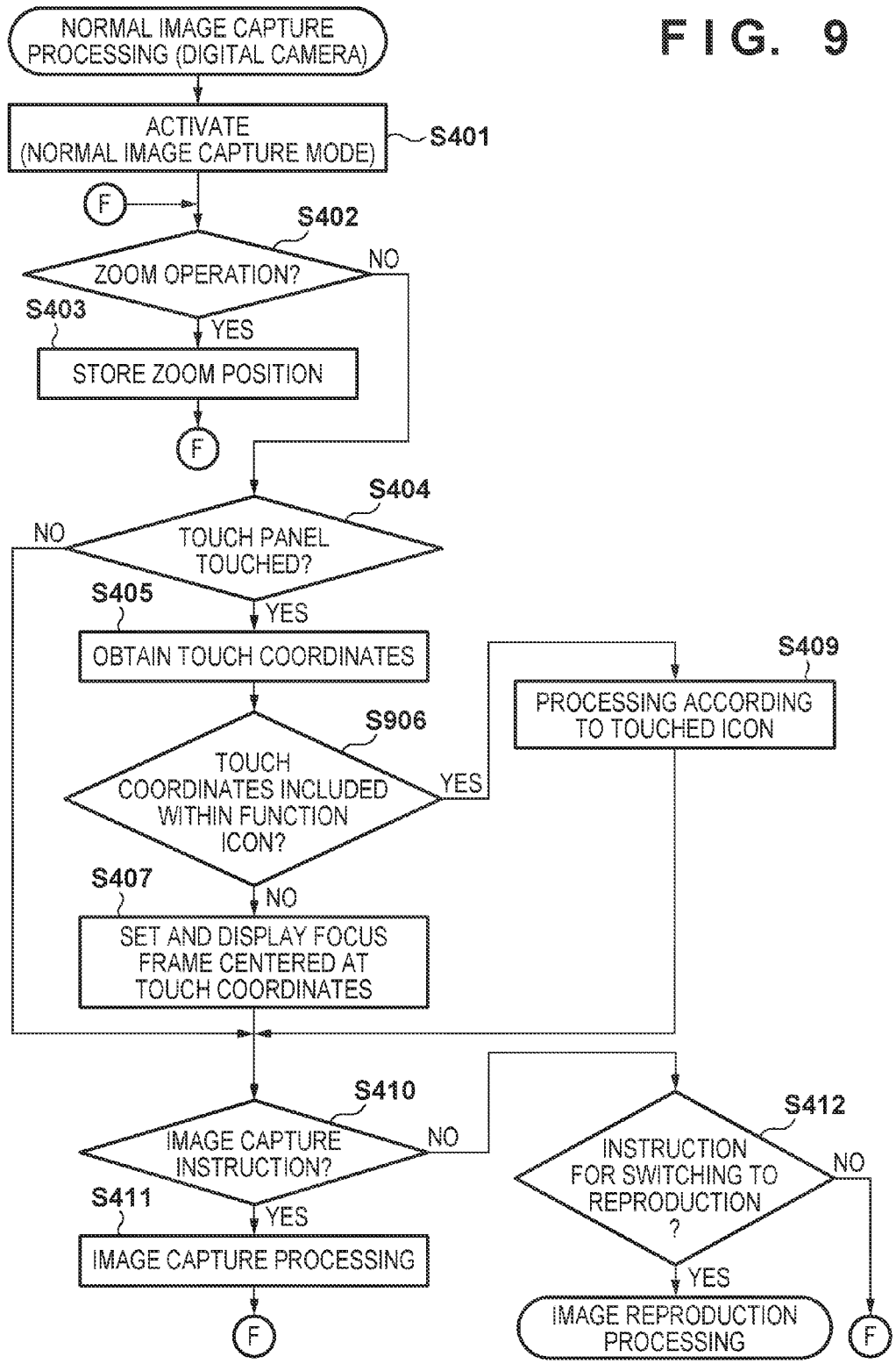
FIG. 9 is a flowchart of normal image capture processing executed by the digital camera 200 according to a second embodiment.

FIG. 9 is a flowchart of normal image capture processing executed by the digital camera 200 according to the second embodiment. In FIG. 9, steps of executing processes that are identical or similar to those of FIG. 4 are given the same reference numerals thereas. It should be noted that the processes of steps shown in the present flowchart are realized by the control unit 201 of the digital camera 200 controlling the components of the digital camera 200 in accordance with an input signal and a program, unless specifically stated otherwise. The processing of the present flowchart is started when the user has issued an activation instruction to the digital camera 200 by, for example, operating the power button.

In step S906, the control unit 201 determines whether touch coordinates obtained in step S405 are within an icon that is responsive to a touch (selectable) (a function icon). In the example of FIG. 5, the icons 502 and 503 are function icons, whereas the icon 504 is not a function icon as it is not responsive to a touch (not selectable). If the touch coordinates are within a function icon, the control unit 201 proceeds to step S409. If the touch coordinates are not within a function icon, the control unit 201 proceeds to step S407.

As described above, in the present embodiment, a focus frame is set and displayed when touch coordinates are not within a function icon. Although the expression "effective range" is not used here, in the process of step S906, it practically means that a region that includes no function icon (i.e., a region other than a display region of a function icon) is the effective range.

It should be noted that, in the second embodiment, the effective range need not perfectly correspond to a position of a function icon. For example, the control unit 201 may treat a region in the vicinity of a function icon as a region that is outside the effective range. In this case, the control unit 201 can operate in accordance with the flowchart of FIG. 4 instead of the flowchart of FIG. 9. That is to say, in step S406, the control unit 201 decides on the effective range based on a position of a function icon, and determines whether touch coordinates are within the effective range.

Furthermore, the control unit 201 may treat not only a region of a function icon, but also a region of an icon whose function is not activated by a touch (e.g., the icon 504 of FIG. 5), as regions outside the effective range. That is to say, the control unit 201 may or may not take an icon other than a function icon into consideration in deciding on the effective range. Moreover, the control unit 201 may treat not only a region of an icon, but also, for example, a region displaying a character on the display unit 206, as regions outside the effective range. In a generalized example, in step S406 of FIG. 4, the control unit 201 can decide on the effective range in accordance with a display layout of an auxiliary image, such as an icon and a character, and determine whether touch coordinates are within the effective range.

As described above, in the second embodiment, an effective range in which a focus frame is set by a touch operation is decided on in accordance with a display layout of an auxiliary image that is displayed by being superimposed over a live-view image. This enables more intuitive setting of a focus frame.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-248419, filed Dec. 8, 2014, which is hereby incorporated by reference herein in its entirety.

What is claimed is:

1. An image capturing apparatus, comprising:
   a detection unit configured to detect a position that has been designated by a user on a first display screen;
   a display unit configured to display, on the first display screen, a captured image generated by an image capturing unit;
   a transmission unit configured to transmit the captured image to an external apparatus, the external apparatus being configured to display the captured image on a second display screen and detect a position that has been designated by the user on the second display screen;
   an obtaining unit configured to obtain, from the detection unit or the external apparatus, position information based on the position designated by the user; and
   a selection unit configured to
      in a case where the position information has been obtained from the detection unit, if the position designated by the user is within a first region corresponding to a part of the captured image on the first display screen, select a partial region of the captured image based on the position information, and
      in a case where the position information has been obtained from the external apparatus, if the position designated by the user is within a second region, which is different from the first region, of the captured image on the second display screen, select a partial region of the captured image based on the position information.

2. The image capturing apparatus according to claim 1, wherein
   the display unit is configured to display an auxiliary image on the first display screen by superimposing the auxiliary image over the captured image, and
   the first region is decided on in accordance with a display layout of the auxiliary image.

3. The image capturing apparatus according to claim 2, wherein
   the auxiliary image includes a first icon that can be selected by the user using the detection unit, and
   the first region does not include a display region of the first icon.

4. The image capturing apparatus according to claim 2, wherein
   the auxiliary image includes a second icon that cannot be selected by the user using the detection unit, and
   the first region is decided on without taking a display region of the second icon into consideration.

5. The image capturing apparatus according to claim 2, wherein
   the first region does not include a display region of the auxiliary image.

6. The image capturing apparatus according to claim 1, wherein
   the second region corresponds to an entire region of the captured image.

7. The image capturing apparatus according to claim 1, wherein
   in the case where the position information has been obtained from the detection unit, the display unit is configured to display an image indicating the partial region selected by the selection unit on the first display screen by superimposing the image over the captured image.

8. The image capturing apparatus according to claim 1, wherein
   in the case where the position information has been obtained from the external apparatus, the transmission unit is configured to transmit, to the external apparatus, information indicating the partial region selected by the selection unit.

9. The image capturing apparatus according to claim 1, wherein
   the first display screen includes a touch panel, and
   the detection unit is configured to detect a position that has been designated by the user using the touch panel.

10. The image capturing apparatus according to claim 1, wherein
    the selection unit is configured to select the partial region of the captured image as a region for focus adjustment of the image capturing unit.

11. A control method for an image capturing apparatus that includes
    a detection unit configured to detect a position that has been designated by a user on a first display screen;
    a display unit configured to display, on the first display screen, a captured image generated by an image capturing unit; and
    a transmission unit configured to transmit the captured image to an external apparatus, the external apparatus being configured to display the captured image on a second display screen and detect a position that has been designated by the user on the second display screen,
    the control method comprising:
    obtaining, from the detection unit or the external apparatus, position information based on the position designated by the user;
    in a case where the position information has been obtained from the detection unit, if the position designated by the user is within a first region corresponding to a part of the captured image on the first display screen, selecting a partial region of the captured image based on the position information; and
    in a case where the position information has been obtained from the external apparatus, if the position designated by the user is within a second region, which is different from the first region, of the captured image on the second display screen, selecting a partial region of the captured image based on the position information.

12. A non-transitory computer-readable storage medium which stores a program for causing a computer to execute a control method for an image capturing apparatus that includes
a detection unit configured to detect a position that has been designated by a user on a first display screen;
a display unit configured to display, on the first display screen, a captured image generated by an image capturing unit; and
a transmission unit configured to transmit the captured image to an external apparatus, the external apparatus being configured to display the captured image on a second display screen and detect a position that has been designated by the user on the second display screen, the control method comprising:
obtaining, from the detection unit or the external apparatus, position information based on the position designated by the user;
in a case where the position information has been obtained from the detection unit, if the position designated by the user is within a first region corresponding to a part of the captured image on the first display screen, selecting a partial region of the captured image based on the position information; and
in a case where the position information has been obtained from the external apparatus, if the position designated by the user is within a second region, which is different from the first region, of the captured image on the second display screen, selecting a partial region of the captured image based on the position information.

* * * * *